(12) United States Patent
Phillips (10) Patent No.: US 10,577,886 B2
(45) Date of Patent: Mar. 3, 2020

(54) DRILL HOLE PLUG WITH ANCHORING GROOVES AND AT LEAST ONE SEALING GROOVE

(71) Applicant: RISE MINING DEVELOPMENTS PTY LTD, O'Connor, Western Australia (AU)

(72) Inventor: Jeffrey Bruce Phillips, O'Connor (AU)

(73) Assignee: Rise Mining Developments Pty Ltd, O'Connor (AU)

( * ) Notice: Subject to any disclaimer, the term of this patent is extended or adjusted under 35 U.S.C. 154(b) by 0 days.

(21) Appl. No.: 15/110,322

(22) PCT Filed: Dec. 22, 2014

(86) PCT No.: PCT/AU2014/001156
§ 371 (c)(1),
(2) Date: Jul. 7, 2016

(87) PCT Pub. No.: WO2015/103661
PCT Pub. Date: Jul. 16, 2015

(65) Prior Publication Data
US 2016/0326828 A1    Nov. 10, 2016

(30) Foreign Application Priority Data

Jan. 13, 2014 (AU) ................................ 2014900100
May 16, 2014 (AU) ................................ 2014901827

(51) Int. Cl.
*E21B 33/12* (2006.01)
*F16L 55/11* (2006.01)
*F42D 1/18* (2006.01)

(52) U.S. Cl.
CPC .......... *E21B 33/12* (2013.01); *E21B 33/1204* (2013.01); *F16L 55/1141* (2013.01); *F42D 1/18* (2013.01)

(58) Field of Classification Search
CPC .... E21B 33/12; F42D 1/18; F16J 15/02; F16J 15/021
(Continued)

(56) References Cited

U.S. PATENT DOCUMENTS 1,117,669 A * 11/1914 Hall .................... E21B 33/1294
138/89
2,973,036 A * 2/1961 Brown .................. E21B 33/122
166/119

(Continued)

FOREIGN PATENT DOCUMENTS

CN          2227193 Y     5/1996
CN          103017622     4/2013
(Continued)

OTHER PUBLICATIONS

International Search Report issued in International Application No. PCT/AU2014/001156, dated Mar. 2, 2015, 3 pages.

*Primary Examiner* — David J Bagnell
*Assistant Examiner* — Jonathan Malikasim
(74) *Attorney, Agent, or Firm* — Hamre, Schumann, Mueller & Larson, P.C.

(57) ABSTRACT

A plug (10) for blocking off mining exploration drill holes. The plug (10) comprises an elongate body (12) of solid impervious material, and an engineered surface (14) is provided on an external circumference of the elongate body (12). The engineered surface (14) comprises an annular anchoring groove (16) having a ramp (18) extending from a maximum diameter to a minimum diameter of the engineered surface (14) in a braking direction, in which it is intended to prevent movement of the plug (10) in the drill hole. The plug (10) also comprises an O-ring (20) received in the anchoring groove (16) and having a thickness whereby it protrudes slightly above the maximum diameter of the engineered surface (14) and engages with a wall (22)

(Continued)

of the drill hole. In use, when the plug (10) is moved in the braking direction in the drill hole, the O-ring (20) rolls up the ramp (18) and wedges between the engineered surface (14) and the wall (22) of the drill hole to provide a braking action for the plug (10) against the wall (22) of the drill hole.

18 Claims, 6 Drawing Sheets

(58) Field of Classification Search
    USPC ................................. 277/630, 637, 609, 616
    See application file for complete search history.

(56) References Cited

U.S. PATENT DOCUMENTS

| | | | | |
|---|---|---|---|---|
| 3,556,213 | A | * | 1/1971 | Kramer .................. E21B 33/00 166/85.2 |
| 3,952,656 | A | | 4/1976 | Fox et al. |
| 4,480,688 | A | * | 11/1984 | Rundell .................. E21B 23/01 166/123 |
| 4,739,899 | A | * | 4/1988 | Thompson ............. F16J 15/062 220/240 |
| 5,293,905 | A | * | 3/1994 | Friedrich ............ F16L 55/1283 138/89 |
| 5,683,116 | A | * | 11/1997 | Folkers .................... F16L 37/08 285/18 |
| 6,568,658 | B2 | * | 5/2003 | Strome ............... E04F 11/1812 256/59 |
| 6,991,048 | B2 | * | 1/2006 | Zupanick ................ E21B 7/061 166/117.6 |
| 8,137,958 | B2 | * | 3/2012 | Grimes ................ G01N 1/2813 422/74 |
| 2010/0326675 | A1 | | 12/2010 | Doane et al. |

FOREIGN PATENT DOCUMENTS

| | | |
|---|---|---|
| FR | 2 586 781 | 3/1987 |
| GB | 707570 | 4/1954 |
| WO | 2012/034181 | 3/2012 |
| WO | 2013/170294 | 11/2013 |
| WO | 2015/035456 | 3/2015 |

* cited by examiner

DRILL HOLE PLUG WITH ANCHORING GROOVES AND AT LEAST ONE SEALING GROOVE

TECHNICAL FIELD

The present invention relates to mining and exploration drilling, and more specifically to a drill hole plug for blocking off mining exploration drill holes. The invention has particular application for blocking off underground diamond drill exploration holes, however the product may also be applied to surface drill holes.

BACKGROUND ART

Once underground access is commenced through a portal or shaft for a new mine, diamond drill crews begin drilling from the first available underground location to allow geologists to better define the ore body so that the design of the mine can be optimised. Therefore exploration drilling usually occurs in advance of the mine development, and typically the exploration drill holes range from horizontal to downward dipping to delineate the ore body beneath and to the side of the main access.

When these exploration drill holes are abandoned, they leave an open hole between the main access and the ore body location which will at some stage be advanced upon. In some cases high pressure water may be encountered during mining, and it is therefore necessary to block these abandoned drill holes to prevent the high pressure water from entering the mine.

Commonly-owned, co-pending Australian Patent Application No 2011301781 discloses a clay plug for sealing water flow from a drill hole. The clay plug 40 of AU2011301781 comprises an elongate sleeve 42 of porous material containing a volume of clay material 44 which in this instance is bentonite clay (although other clays may also be suitable). The clay plug 40 further includes a liner 46 of water-soluble material, and a substantially solid central core 48 running substantially the length of the plug. The advantage of using bentonite clay as the "grouting" material in this plug is that bentonite clay slowly expands and seals when in contact with water. The contents of AU2011301781 are incorporated herein by reference.

Diamond drill holes are drilled by rotation only drill rigs, and as a result drill a hole through hard rock which only varies slightly in diameter with drill bit wear. Due to this small variation in diameter, it is possible to use close tolerances when designing and installing tools or implements into a diamond drill hole.

The present invention was developed with a view to providing a plug for plugging a drill hole that exploits this close tolerance by using an O-ring to provide a braking action against the wall of the diamond drill hole. The plug is prevented from being pushed out of the diamond drill hole by the braking action of the O-ring. Whilst the plug is designed to resist significant water pressure and water flow when installed into a diamond drill hole, it will be understood that the O-ring plug may also have wider application.

References to prior art in this specification are provided for illustrative purposes only and are not to be taken as an admission that such prior art is part of the common general knowledge in Australia or elsewhere.

SUMMARY OF INVENTION

According to one aspect of the present invention there is provided, a plug for blocking a drill hole, the plug comprising:

an elongate body of solid impervious material;

an engineered surface provided on an external circumference of the elongate body, the engineered surface comprising an annular anchoring groove having a ramp extending from a maximum diameter to a minimum diameter of the engineered surface in a braking direction in which it is intended to prevent movement of the plug in the drill hole; and, an O-ring received in the anchoring groove of the engineered surface and having a thickness whereby it protrudes above the maximum diameter of the engineered surface and engages with a wall of the drill hole wherein, in use, when the plug is moved in the braking direction in the drill hole the O-ring rolls up the ramp and wedges between the engineered surface and the wall of the drill hole to provide a braking action for the plug against the wall of the drill hole.

In one embodiment the engineered surface is formed integral to the material of the body of the plug. In an alternative embodiment the engineered surface is formed on a hollow collar which is fixed to the external circumference of the elongate body. In the latter embodiment the elongate body may be a clay plug similar to that described in co-pending AU2011301781.

Preferably the anchoring groove also has a shoulder located opposite to the ramp, the O-ring abutting the shoulder when the plug is inserted into the drill hole in an installation direction opposite to the braking direction. In one embodiment the shoulder extends in a plane substantially perpendicular to a longitudinal axis of the elongate body. In an alternative embodiment the shoulder extends in a plane angled to the longitudinal axis of the elongate body at an angle θ of between about 25° to 75°. Preferably the angle θ is selected so that when the O-ring is seated against the shoulder there is some clearance between the O-ring and the wall of the drill hole wherein, in use, when the plug is moved in the installation direction any friction between the O-ring and the wall of the drill hole is minimized. Preferably the anchoring groove also has a base of substantially constant diameter provided between the shoulder and the ramp, the base containing the O-ring during movement of the plug in the drill hole in the installation direction. The ramp is preferably angled at substantially 30° to a longitudinal axis of the plug, but may vary from between 10° to 60°.

Preferably the anchoring groove is one of a plurality of anchoring grooves of the engineered surface, and the O-ring is one of a plurality of O-rings received in each of the anchoring grooves respectively. Advantageously the braking function of the O-rings is separated from the sealing function by providing one or more sealing O-rings in addition to braking O-rings. Preferably one or more annular sealing grooves of rectangular cross-section are provided in the engineered surface for receiving respective sealing O-rings seated therein. Typically a plurality of annular sealing grooves is provided in front of the anchoring grooves and/or behind the anchoring grooves.

Advantageously a fluid port is provided across each anchoring groove to provide fluid communication and therefore pressure balancing across each anchoring O-ring. In one embodiment a plurality of fluid ports extend through the body of the plug, from an outer circumference at each fluid port location to a central port.

In another embodiment a reversed ramped O-ring is received in a groove, which has a reversed ramp extending from a maximum diameter to a minimum diameter of the engineered surface in the installation direction wherein, in use, the plug can also be anchored in the installation direction. Preferably one or more positioning rods are provided to hold the reversed ramped O-ring during installation, keeping it on a sufficient angle and clearance distance from the reversed ramp so that it does not interact with the ramp during installation.

In a still further embodiment a second O-ring is received in the anchoring groove and supports the first O-ring in a position at a beginning of the ramp as it contacts the wall of the drill hole during installation whereby, in use, the two O-rings engage with each another by frictional contact and rotate together like a geared pair, rotating in opposite directions, so that as the first O-ring rotates in a direction to roll down the ramp during installation it is held in place at the beginning of the ramp by a spring action of the second O-ring. Typically the first and second O-rings are of substantially the same size.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of several specific embodiments of an O-ring plug, given by way of example only, with reference to the accompanying drawings, in which.

DESCRIPTION OF EMBODIMENTS

A first embodiment of an O-ring plug 10 in accordance with the invention for blocking a drill hole, as illustrated in FIGS. 1 to 5, comprises an elongate body 12 of solid impervious material. An engineered surface 14 is provided on an external circumference of the elongate body 12, the engineered surface comprising an annular anchoring groove 16. The anchoring groove 16 has a ramp 18 extending from a maximum diameter D1 to a minimum diameter D2 of the engineered surface 14 in a braking direction, indicated by arrow 'A' in FIG. 1. The braking direction is the direction in which it is intended to prevent movement of the plug in the drill hole.

Figure 1:
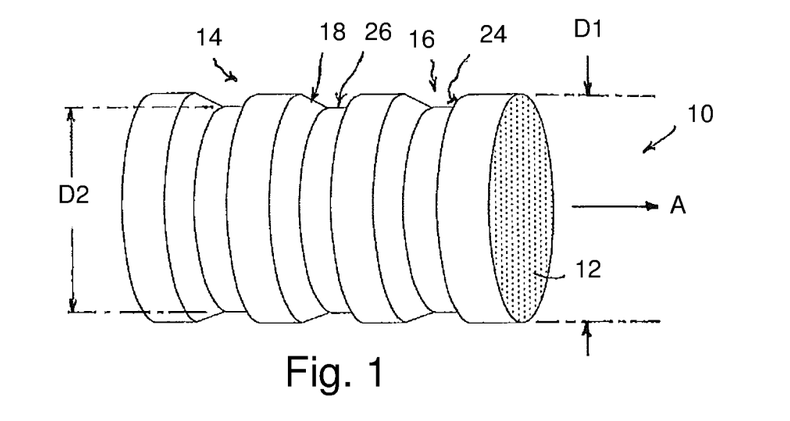
FIG. 1 is a perspective view of a first embodiment of an O-ring plug according to the present invention prior to assembly of the O-rings.
Figure 2:
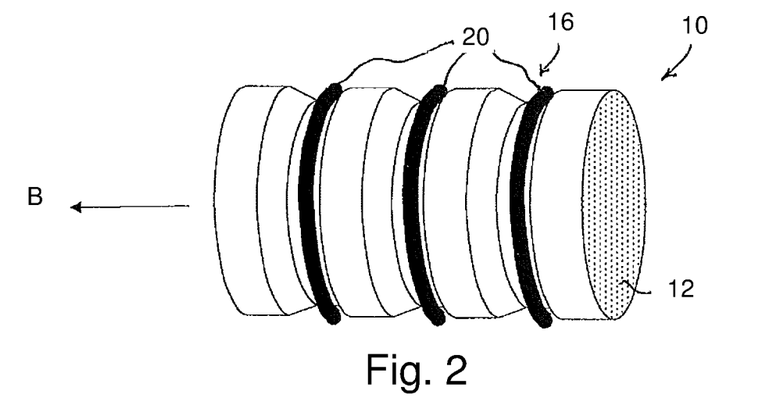
FIG. 2 is a perspective view of the O-ring plug of FIG. 1 with O-rings, showing the position of the O-rings during installation.
Figure 4:
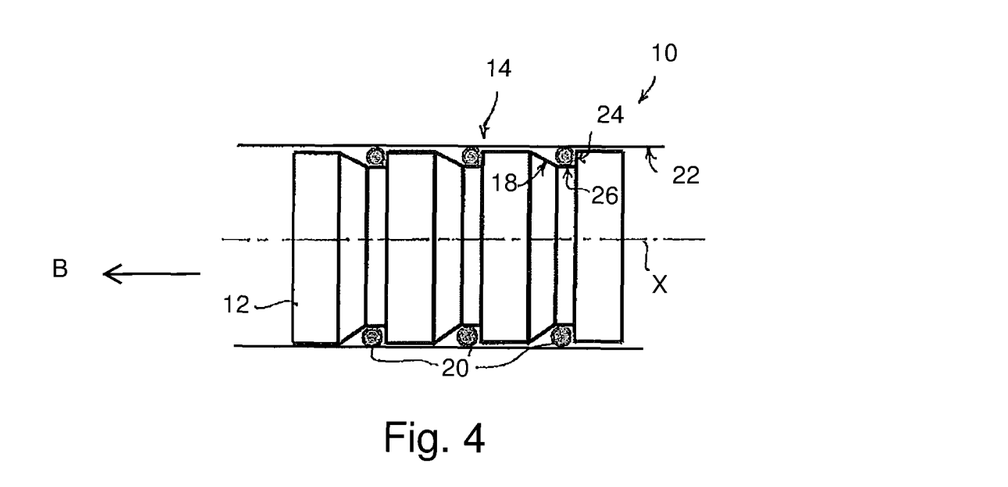
FIG. 4 is a side elevation of the O-ring plug of FIG. 1 showing the position of the O-rings in section view during installation.

The plug 10 further comprises an O-ring 20 received in the annular groove 16 of the engineered surface 14. The O-ring 20 has a thickness whereby it protrudes slightly above the maximum diameter D1 of the engineered surface 14, as can be seen in FIGS. 2 and 4, and engages with a wall 22 of the drill hole. In use, when the plug 10 is moved in the braking direction 'A' in the drill hole, the O-ring 20 rolls up the ramp 18 and wedges between the engineered surface 14 and the wall 22 of the drill hole to provide a braking action for the plug 10 against the wall 22 of the drill hole.

In the illustrated embodiment the engineered surface 14 is formed integral to the material of the body 12 of the plug 10, which may be machined from steel or a hard plastics material, such as nylon. However in an alternative embodiment the engineered surface may be formed on a hollow collar which is fixed to the external circumference of the elongate body. In the latter arrangement the elongate body may be a clay plug similar to that described in co-pending AU2011301781 or it may be a solid core made of some other material.

Preferably the annular groove 16 also has a shoulder 24 located opposite to the ramp 18, the O-ring 20 abutting the shoulder 24 when the plug is inserted into the drill hole in an installation direction, indicated by arrow 'B' in FIG. 2. The installation direction 'B' is opposite to the braking direction 'A'. Typically the shoulder 24 extends in a direction substantially perpendicular to a longitudinal axis 'X' of the elongate body 12, as can be seen most clearly in FIG. 4. Preferably the annular groove 16 also has a base 26 of substantially constant diameter provided between the shoulder 24 and the ramp 18. The base 26 contains the O-ring 20 within the groove 16 during movement of the plug 10 in the drill hole in the installation direction 'B', as shown in FIGS. 2 and 4. During movement of the plug 10 in the installation direction 'B' there will be a small degree of resistance to movement as the outer circumference of O-ring 20 rubs against the wall 22 of the diamond drill hole. The O-ring 20 itself is prevented from moving from base 26 within the groove 16 by shoulder 24.

Figure 3:
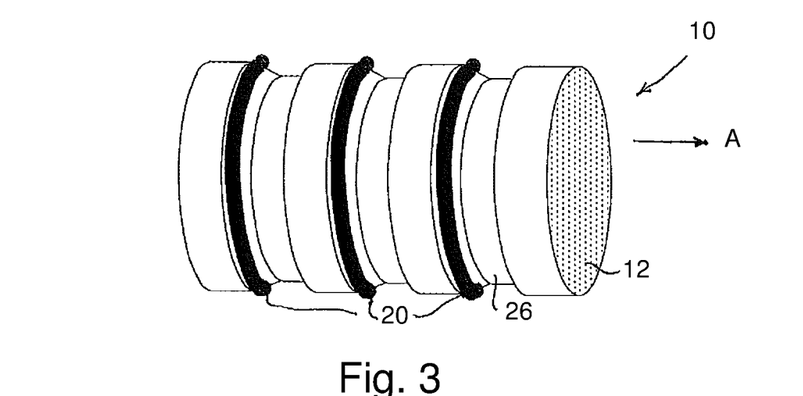
FIG. 3 is a perspective view of the O-ring plug of FIG. 1 with O-rings, showing the position of the O-rings after placement of the plug.
Figure 5:
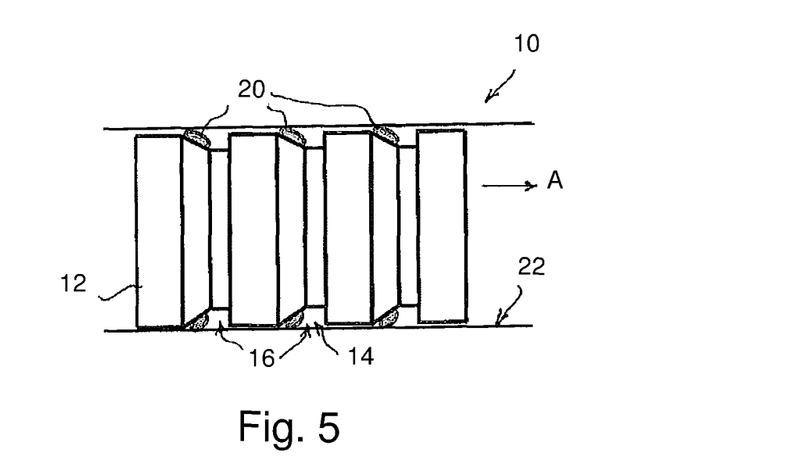
FIG. 5 is a side elevation of the O-ring plug of FIG. 1 showing the position of the O-rings in section view after placement of the plug.

However, once the plug 10 is correctly positioned in the drill hole, the direction of movement is reversed to the braking direction 'A', as shown in FIGS. 3 and 5. In this direction of movement of the plug 10, the O-ring 20 is free to move within the groove 16 and will roll from its rest position on the base 26 'up' the ramp 18 as its outer circumference engages with the wall 22 of the drill hole. The more force is applied to the body 12 of the plug 10, the more the O-ring 20 will try to roll further 'up' the ramp 18, and therefore the more firmly wedged it will become between the ramp 18 and the wall 22 of the drill hole, as can be seen most clearly in FIG. 5. This increases both the friction and the force the plug 10 exerts on the drill hole, both of which create the holding ability within the drill hole, locking the plug 10 in that position.

It will be seen that in this embodiment the O-ring 20 performs two tasks: the primary task is that of a brake, which allows the plug 10 with the engineered surface 14 to be installed in one direction, but not to be reversed; a secondary task is to act as a seal, albeit a necessarily imperfect one due to the imperfections in the rock surface of the wall 22 of the diamond drill hole against which it is "sealing".

In the illustrated embodiment of the plug 10, the annular groove 16 is one of a plurality of annular grooves 16a, 16b and 16c of the engineered surface 14, and the O-ring 20 is one of a plurality of O-rings 20a, 20b and 20c received in each of the annular grooves 16 respectively. Whilst a single O-ring 20 may suffice in some drill holes, the use of multiple O-rings 20 multiplies the braking effect.

In this manner it is possible to construct a plug that will install into a diamond drill hole one way, against significant water pressure and water flow, or air blast pressure from rifling explosives. The device is prevented from being pushed out of the diamond drill hole by the braking action of the O-ring 20, or multiple O-rings, interacting with the wall 22 of the diamond drill hole.

Pushing the plug 10 in the original installation direction 'B' again will allow it to once again move freely in the installation direction. The O-ring will roll 'down' the ramp 18 to the initial rest position against the square shoulder 24, at which point the plug 10 will then be free to slide further into the drill hole.

The ramp 18 is preferably angled at approximately 30° to the longitudinal axis 'X' of the plug 10, but may vary from between 10° to 60° depending on circumstances. The construction of the plug 10 with multiple, identical ramps 18, each within its respective annular groove 16, is relatively simple with conventional lathe equipment or a CNC machine. The plug construction is completed by placement of one O-ring 20 in each of the grooves 16. The plug 10 can then be installed into a diamond drill hole.

In use, the O-rings 20 are designed to interfere with the wall 22 of the drill hole slightly during installation, when in the rest position on bases 26, providing (a) frictional drag on the wall 22 of the diamond drill hole, and (b) an imperfect seal. The plug 10 is pushed into the hole with the diamond drill rig feed pressure, with minimal force. When the feed from the drill rig is retracted, the O-rings 20 will roll in place due to the frictional contact with the wall 22 of the hole, and the plug 10 will be forced slightly back toward the drill rig due to the water pressure upon the plug. This causes each O-ring 20 to roll 'up' its respective ramp 18, creating both a circumferential force and a frictional resistance on the wall 22 of the diamond drill hole, locking the plug 10 in place and holding fast against the water pressure.

Figure 6:
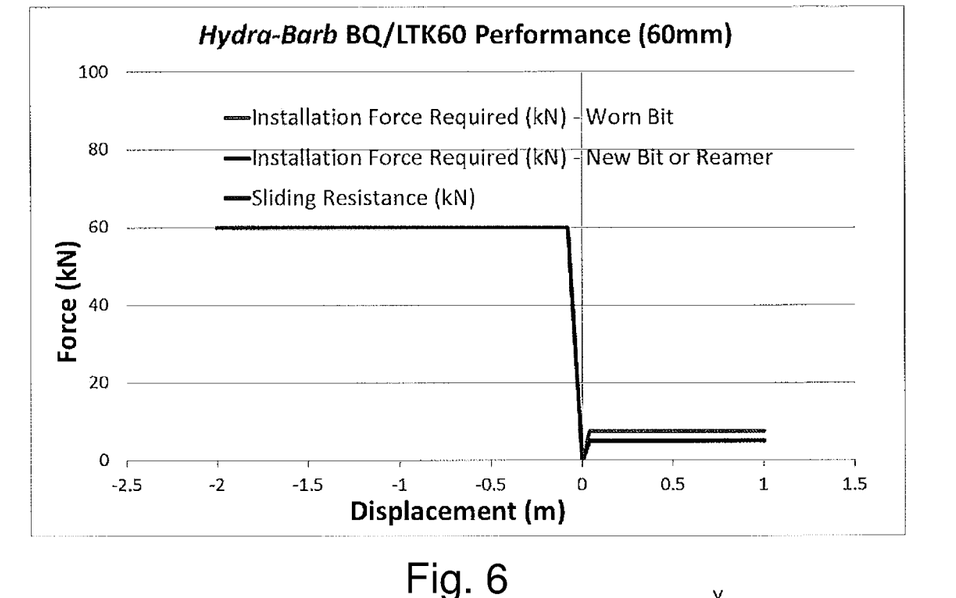
FIG. 6 is a graph showing a comparison of the force required for installation compared to the sliding resistance in the braking direction of an O-ring plug according to the present invention.

FIG. 6 is a graph illustrating the difference in force required during installation of an O-ring plug in a 60mm diameter drill hole, compared to the braking force when the O-ring plug is withdrawn from the drill hole. In FIG. 6 forward displacement (installation) is shown as positive displacement on the horizontal axis and pressure holding ability (braking resistance) is shown as negative on the horizontal axis.

From FIG. 6 it can be seen that there is some force required to install the O-ring plug, (shown by the two positive displacement lines), dependant on bit wear. In the reverse direction the force required to withdraw the plug from the drill hole is an order of magnitude higher or more (shown by the negative displacement line). In addition to the force required to install the O-ring plug, this method of installation can, over large distances, cause excessive wear to the O-ring(s).

There are circumstances where it is important to be able to install a plug with O-ring plugs more easily, for example, manually rather than with a machine. Therefore it is desirable for the O-ring to form an interference fit in the drill hole once in position, but to be able to minimise interference during installation. Since an O-ring is flexible, this can be achieved geometrically. If the O-ring is pushed in at an angle greater than 25° or thereabouts, and additionally if the O-ring has clearance to the seat perpendicular to the angle imposed and perpendicular to the direction of the drill hole, it is then possible to push in a slightly larger O-ring to the final resting position with comparatively little resistance. Once at the resting position, the O-ring may be manipulated back into a perpendicular orientation to perform the anchoring task. Alternatively it may be used at the inclined orientation.

Figure 7:
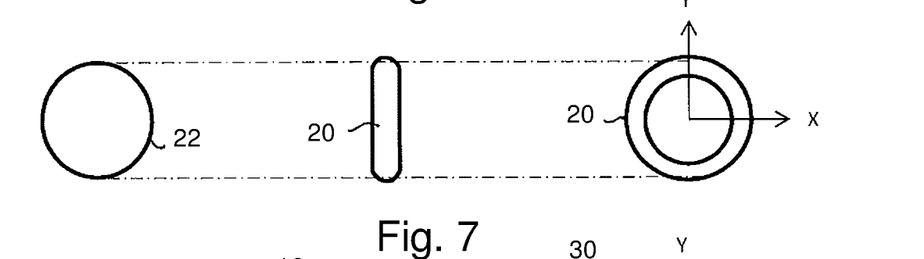
FIG. 7 illustrates an O-ring diameter compared to a drill hole diameter.
Figure 8:
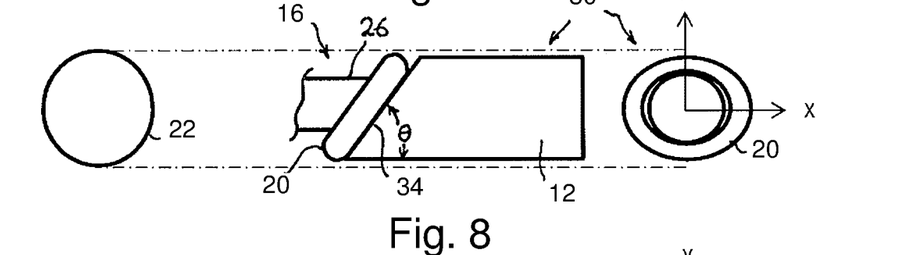
FIG. 8 is a side elevation and an end elevation of part of a second embodiment of an O-ring plug according to the present invention.
Figure 9:
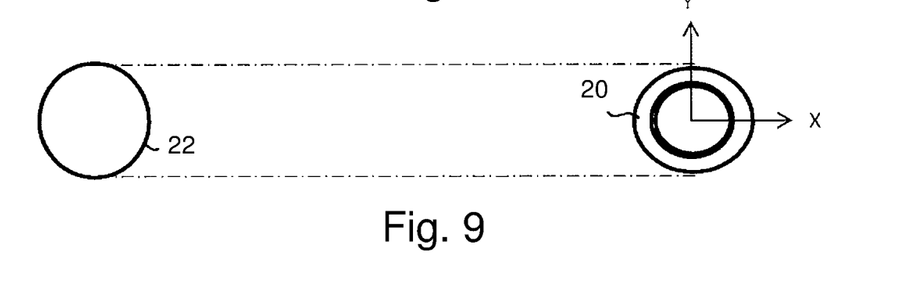
FIG. 9 illustrates the clearance between the O-ring of the O-ring plug of FIG. 8 and a wall of the drill hole during installation.

FIGS. 7 to 9 will be used to describe a second embodiment of an O-ring plug 30 according to the present invention that incorporates this feature. As this embodiment shares many of the same features as the first embodiment of the O-ring plug 10, the same reference numerals will be used to identify the similar parts and will not be described again in detail. As shown in FIG. 7, when the O-ring 20 is substantially perpendicular to the longitudinal axis (Z-axis) of the O-ring plug, the outside diameter of the O-ring is slightly larger than the diameter of the drill hole so that it interferes with the drill hole wall 22 in both the X-axis and Y-axis directions. However if the O-ring is angled to the longitudinal axis of the elongate body at an angle $\theta$ of between about 25° to 75°, as shown in FIG. 8, then there will some clearance between the O-ring 20 and the drill hole wall 22, at least in the direction of the Y-axis.

In order to achieve this geometry, the annular groove 16 in the engineered surface 14 of the elongate body 12 is formed with a shoulder 34, inclined at an angle $\theta$ to the longitudinal axis of the elongate body, as shown in FIG. 8. The angle $\theta$ is selected so that when the O-ring 20 is seated against the shoulder 34 there is some clearance between the O-ring 20 and the wall 22 of the drill hole wherein, in use, when the plug 30 is moved in the installation direction any friction between the O-ring 20 and the wall 22 of the drill hole is minimized. Due to the flexibility of the O-ring and the clearance to the base 26 of the groove, this geometry also gives sufficient clearance in the direction of the X-axis during installation, as shown in FIG. 9.

Once the O-ring plug 30 is in the rest position, in order to bring the O-ring 20 back to a more perpendicular orientation, the body 12 may be rotated at the same time as the direction of linear movement in the drill hole is reversed to the braking direction, as with the previous embodiment shown in FIGS. 3 and 5. In this direction of movement of the plug 30, the O-ring 20 is free to move within the groove 16. At the same time, the inclined surface of shoulder 34 will force the O-ring to a more perpendicular orientation to increase the interference with the drill hole wall 22. The O-ring 20 will roll then from its rest position on the base 26 'up' the ramp 18 (not shown in FIG. 8) as its outer circumference engages with the wall 22 of the drill hole. The more force is applied to the body 12 of the plug 30, the more the O-ring 20 will try to roll further 'up' the ramp 18, and therefore the more firmly wedged it will become between the ramp 18 and the wall 22 of the drill hole.

By incorporating this geometry in the design of an O-ring plug, the installation process of the O-ring becomes one and the same as the installation process of the plug, albeit with one possible additional step, namely rotation of the plug at the end of the process. Additionally, in some situations a plug may be required to be pushed into a drill hole by a drill rig over hundreds of metres, and the wear on the O-rings would then be a significant factor that may detract from their ability to provide an adequate braking action. However if the O-rings are angled forward until placement it will prevent excessive wear of the O-rings from occurring.

The original ramped O-ring configuration of the first embodiment (illustrated in FIGS. 1 to 5) combined a braking action as the primary task with a sealing action as a secondary task. Anchoring drives the O-ring up the ramp; yet because the pressure from the fluid within the drill hole acts in the opposite direction, there is a danger that the O-ring seal may be compromised at higher pressures. Accordingly the maximum pressure to failure that can be held by one O-ring is limited to around 250 psi (17 Bar). While this is just sufficient for some applications, it does not allow any room for a Factor of Safety.

Advantageously the braking (anchoring) and sealing functions can be separated by providing standard piston-type sealing glands with additional O-rings on a plug, positioned before and/or after the anchoring O-rings. Because a rock surface is not smooth to the extent of forming a perfect seal (e.g. the inside of a drill hole as opposed to a machined cylinder), there is always a very small amount of leakage past any of the O-rings 20 on the O-ring plug 10. Normally in a standard O-ring used for sealing in machined metal components, O-rings in series are redundant since the first O-ring seals with negligible leakage past it. Further O-rings downstream therefore are unwarranted in that instance. However, in rock, where there is always inherent leakage past O-rings due to imperfect sealing, (albeit with very small flows), the more sealing O-rings provided in series the more barriers are present to resist the leakage and therefore lower the amount of leakage.

Figure 10:
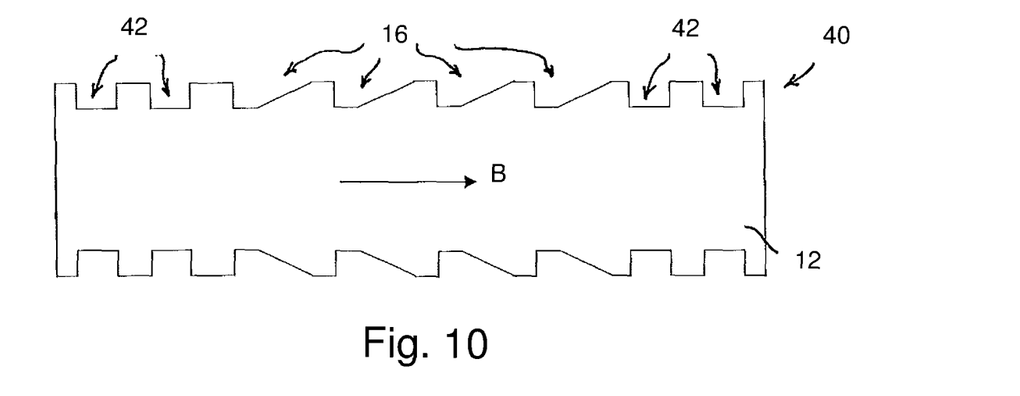
FIG. 10 is a longitudinal section view of a third embodiment of an O-ring plug according to the present invention, (O-rings not shown) in which the sealing and anchoring functions are separated.

A third embodiment of a high pressure water sealing O-ring plug 40 for a diamond drill hole, in which the braking (anchoring) and sealing functions are separated, is illustrated in FIG. 10 (shown in long section without the O-rings). As this embodiment shares many of the same features as the first embodiment of the O-ring plug 10, the same reference numerals will be used to identify the similar parts and will not be described again in detail. As shown in FIG. 10, there are four annular anchoring grooves 16 in the engineered surface 14 on the body of the plug 40, each of the grooves 16 providing a seat for one of the braking O-rings 20 (not shown).

There are also two pairs of annular sealing grooves 42 provided in the engineered surface 14, the first pair provided in front of the ramped anchoring grooves and the second pair provided behind the anchoring grooves (when viewed in the direction of installation). The sealing grooves 42 are of rectangular shape in cross-section, as shown in FIG. 10, similar to standard piston-type sealing glands, for receiving respective sealing O-rings seated therein. The provision of multiple sealing O-rings means that the pressure drop across each O-ring is shared, making the task easier than it would be for a single O-ring.

The provision of the sealing O-rings can reduce the pressure on the anchoring O-rings to the extent where one O-ring will hold 700-800 psi (48-55 Bar). For an NQ 76 mm plug this is approximately 2 tonne per O-ring, so four anchoring O-rings gives a potential anchoring force of 8 tonne, which has since been confirmed in a hydraulic press. To allow for drill bit wear, and hence variations in drill hole diameter, these pressure sealing O-rings may be on successively larger diameter seat heights.

From the explanation given above of the third embodiment of the O-ring plug 40, the pressure on anchoring O-rings in the presence of sealing O-rings is now approximately one half or even less than that without sealing O-rings. Yet there is still a pressure drop across each of the anchoring O-rings. Ideally, for maximum anchoring performance, the pressure differential on each side of the anchoring O-rings should be removed completely.

Figure 11:
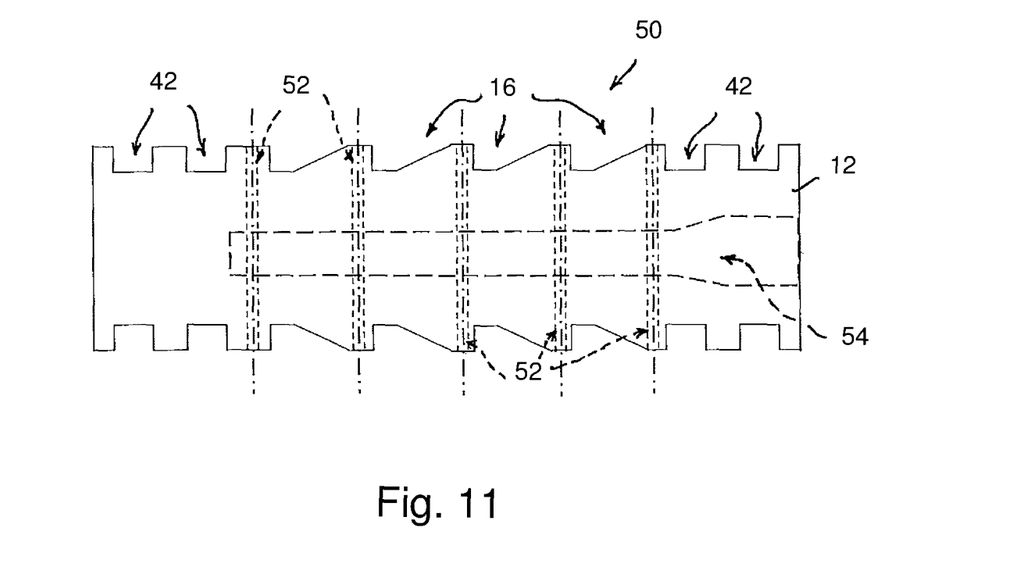
FIG. 11 is a longitudinal section view of a fourth embodiment of an O-ring plug according to the present invention, (O-rings not shown) in which fluid ports are provide to balance the pressure across anchoring O-rings.

FIG. 11 illustrates a fourth embodiment of the O-ring plug 50 in which a fluid port 52 is provided across each anchoring groove 42, providing fluid communication that allows free water flow and therefore pressure balancing across each anchoring O-ring 20 (not shown). This could be in the form of a channel scored into the side of the plug across each ramp 18. However this would be potentially problematic in that sharp edges on the ramps could then cut into the anchoring O-rings while they perform the anchoring task.

A better approach is to drill the ports 52 through the body 12 of the plug 50, from the circumference at each port location to a central port 54, as shown in FIG. 11. This then removes any pressure drop across the anchoring O-rings and ensures that all of the pressure sealing is carried out by the sealing O-rings. Note the central port 54 should be blocked off during manufacture on completion of the porting of the plug.

Figure 12:
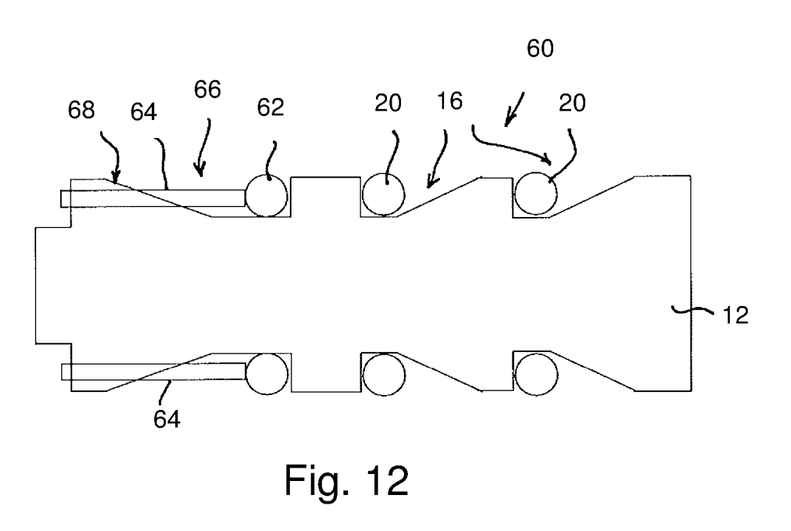
FIG. 12 is a longitudinal section view of a fifth embodiment of an O-ring plug according to the present invention, in which a reversed ramped O-ring is provided.

There is on occasion a requirement to install a plug which, when installed, will no longer easily slide forward (in the installation direction). This may be, for example, when the drilling crew wish to grout behind the plug, and therefore one of the tasks of the plug is to hold a column of grout behind it. This can be achieved by having one or more reversed ramped O-rings. FIG. 12 illustrates a fifth embodiment of the O-ring plug 60 according to the present invention with provision for a reversed ramped O-ring 62. The reversed ramped O-ring 62 is received in a groove 66, which has a reversed ramp 68 extending from a maximum diameter to a minimum diameter of the engineered surface in the installation direction.

The difficulty with this arrangement is to stop the reversed ramped O-ring 62 from rolling up the ramp 68 and wedging between the engineered surface and the wall of the drill hole during installation. This can be achieved by using one or more positioning rods 64 to hold the reversed ramped O-ring 62 during installation, keeping it on a sufficient angle and clearance distance from the reversed ramp 68 so that it does not interact with the ramp during installation (as illustrated in FIG. 12).

With this arrangement, when the drill bit (or other installation tool) is removed from the plug, together with the positioning rods, the O-ring 62 is then free to move and to perform its task of anchoring the plug in the forwards (installation) direction. This may be a standalone reversed ramp O-ring, or it may be combined with normal braking O-rings and ramps which will anchor a plug in the braking direction (as shown in FIG. 12), and/or combined with sealing O-rings depending on the task.

Figure 13:
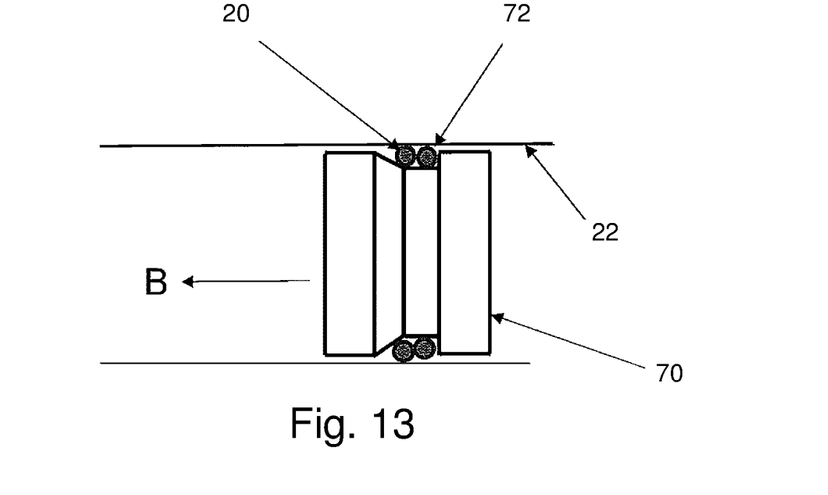
FIG. 13 is a side elevation of a sixth embodiment of an O-ring plug according to the present invention, showing the position of a pair of O-rings in section view during installation; and, FIG. 14 is an enlarged view of the pair of O-rings in FIG. 13 showing how they rotate like a geared pair during installation.
Figure 14:
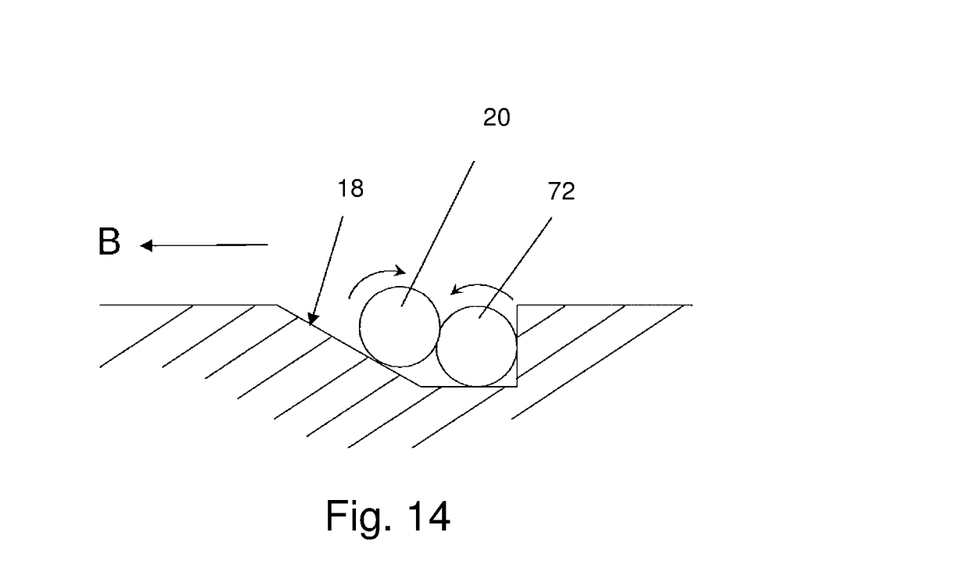

A need was also identified for an O-ring plug to provide quick, simple, and routine capping-off of diamond drill holes. Such a plug would protect from rifling if the hole happens to intersect an active mining area, i.e. the plug will block any air blast as well as lower water pressures. FIGS. 13 and 14 illustrate a sixth embodiment of an O-ring plug 70 designed to meet this need. This kind of plug is used routinely in diamond drill holes that don't have significant amounts of water, which is the majority. This plug works by having two O-rings in each anchoring groove, as described in more detail below. The anchoring feature is essentially the same as in the embodiments previously described. The advantage with two O-rings is that it reduces wear during installation on the O-ring contacting the wall of the drill hole. It also provides a reliable forward resistance which means the plug will support a grout column behind it if the mine wishes to install one.

As the O-ring plug 70 illustrated in FIGS. 13 and 14 shares many of the same features as the first embodiment of the O-ring plug 10, the same reference numerals will be used to identify the similar parts and will not be described again in detail. In this embodiment the first O-ring 20 is partnered in the anchoring groove 16 with a second trailing O-ring 72 of substantially the same size. This second O-ring 72 acts as a spring support, and supports the first O-ring 20 in a position at the beginning of the ramp 18 as it contacts the wall 22 of the drill hole during installation. The first O-ring 20 rotates in the direction to roll down the ramp 18 during movement of the plug 72 in the installation direction B, as shown in FIG. 14, but is held in place by the spring action of the second O-ring 72.

The two O-rings 20, 72 engage with each another by frictional contact and rotate together like a geared pair, rotating in opposite directions. This combined rotation and spring action acts to (a) reduce the frictional wear on the first O-ring 20, and (b) provide a forward resistance on the plug 70 of approximately 100 kg. A forward resistance is desirable in some circumstances because it allows the plug to support a grouted column placed behind the plug after installation. Without this, the plug may slide forward due to the weight of the grout column behind it. With duplicated anchoring grooves and pairs of O-rings the forward resistance can be tailored to suit the requirements and to support, for example, a grout column behind the plug 70. In other respects the plug 70 operates in substantially the same way as the first embodiment described above.

Now that several embodiments of the O-ring plug have been described in detail, it will be apparent that the described embodiments provide a number of advantages over the prior art, including the following:

(i) The plug is simple to manufacture and install, requiring no specialised equipment or tools.
(ii) The self-locking, anchoring or braking action of the plug provides a very secure blockage in the drill hole.
(iii) The use of multiple O-rings not only increases the braking action, but also improves the seal against the wall of the drill hole, inhibiting the escape of water.
(iv) The incorporation of the angled shoulder to reduce the interference of the O-ring with the drill hole wall enables the plugs to be manually installed in a drill hole.
(v) Separating the braking function from the sealing function by the addition of one or more sealing O-rings not only improves the sealing but also the anchoring resistance.

It will be readily apparent to persons skilled in the relevant arts that various modifications and improvements may be made to the foregoing embodiments, in addition to those already described, without departing from the basic inventive concepts of the present invention. For example, the thickness of the O-rings and the corresponding depth of the grooves, relative to the diameter of the body of the plug, may vary substantially from that shown in the illustrated embodiments. Therefore, it will be appreciated that the scope of the invention is not limited to the specific embodiments described.

The invention claimed is:

1. A plug configured to resist water pressure in horizontal and downward dipping drill holes in a rock mass, the plug comprising:
    an elongate body made of solid impervious material;
    an engineered surface provided on an external circumference of the elongate body, the engineered surface comprising an annular anchoring groove having a ramp extending from a maximum diameter of the elongate body to a minimum diameter of the elongate body in a braking direction in which it is intended to prevent movement of the plug in the drill hole in the rock mass when the plug is inserted in the drill hole; and,
    an O-ring received in the anchoring groove of the engineered surface and having a thickness whereby the O-ring protrudes above the maximum diameter of the elongate body and engages with a wall of the drill hole in the rock mass wherein, in use with the plug inserted in the drill hole in the rock mass, when the plug is moved in the braking direction in the drill hole the O-ring rolls up the ramp and wedges between the engineered surface and the wall of the drill hole to provide a braking action for the plug against the wall of the drill hole;
    wherein the anchoring groove is one of a plurality of anchoring grooves of the engineered surface, and the O-ring is one of a plurality of O-rings received in each of the anchoring grooves respectively in series, and wherein a braking function of the O-rings in the anchoring grooves is separated from a sealing function by providing one or more sealing O-rings in addition to the O-rings in the anchoring grooves, and one or more annular sealing grooves of rectangular cross-section are provided in the engineered surface that receive the one or more sealing O-rings therein.

2. The plug configured to resist water pressure in the horizontal and downward dipping drill holes in the rock mass as defined in claim 1, wherein the engineered surface is formed integral to the material of the body of the plug.

3. The plug configured to resist water pressure in the horizontal and downward dipping drill holes in the rock mass as defined in claim 1, wherein the engineered surface is formed on a hollow collar which is fixed to the external circumference of the elongate body.

4. The plug configured to resist water pressure in the horizontal and downward dipping drill holes in the rock mass as defined in claim 3, wherein the elongate body is a clay plug.

5. The plug configured to resist water pressure in the horizontal and downward dipping drill holes in the rock mass as defined in claim 1, wherein each one of the anchoring grooves also has a shoulder located opposite to the ramp, the respective O-ring abutting the shoulder when the plug is inserted into the drill hole in an installation direction opposite to the braking direction.

6. The plug configured to resist water pressure in the horizontal and downward dipping drill holes in the rock mass as defined in claim 5, wherein the shoulder extends in a plane substantially perpendicular to a longitudinal axis of the elongate body.

7. The plug configured to resist water pressure in the horizontal and downward dipping drill holes in the rock mass as defined in claim 5, wherein the shoulder extends in a plane angled to a longitudinal axis of the elongate body at an angle θ of between about 25° to 75°.

8. The plug configured to resist water pressure in the horizontal and downward dipping drill holes in the rock mass as defined in claim 7, wherein the angle θ is selected so that when the O-ring is seated against the shoulder there is some clearance between the O-ring and the wall of the drill hole wherein, in use, when the plug is moved in the installation direction any friction between the O-ring and the wall of the drill hole is minimized.

9. The plug configured to resist water pressure in the horizontal and downward dipping drill holes in the rock mass as defined in claim 8, wherein each one of the anchoring grooves also has a base of substantially constant diameter provided between the shoulder and the ramp, the base containing the O-ring during movement of the plug in the drill hole in the installation direction.

10. The plug configured to resist water pressure in the horizontal and downward dipping drill holes in the rock mass as defined in claim 5, wherein a reversed ramped O-ring is received in a reversed ramped groove, which has a reversed ramp extending from the maximum diameter to the minimum diameter of the elongate body in the installation direction wherein, in use, the plug can also be anchored in the installation direction.

11. The plug configured to resist water pressure in the horizontal and downward dipping drill holes in the rock mass as defined in claim 10, wherein one or more positioning rods are provided to hold the reversed ramped O-ring during installation, keeping the reversed ramped O-ring on a sufficient angle and clearance distance from the reversed ramp so that the reversed ramped O-ring does not interact with the ramp during installation.

12. The plug configured to resist water pressure in the horizontal and downward dipping drill holes in the rock mass as defined in claim 1, wherein the ramp of each one of the anchoring grooves is angled at between 10° to 60° to a longitudinal axis of the plug.

13. The plug configured to resist water pressure in the horizontal and downward dipping drill holes in the rock mass as defined in claim 12, wherein the ramp of each one of the anchoring grooves is angled at substantially 30° to the longitudinal axis of the plug.

14. The plug configured to resist water pressure in the horizontal and downward dipping drill holes in the rock mass as defined in claim 1, wherein a plurality of the annular sealing grooves are provided in front of the anchoring grooves and/or behind the anchoring grooves.

15. The plug configured to resist water pressure in the horizontal and downward dipping drill holes in the rock mass as defined in claim 14, wherein a fluid port is provided across each anchoring groove to provide fluid communication and therefore pressure balancing across each O-ring in the anchoring grooves.

16. The plug configured to resist water pressure in the horizontal and downward dipping drill holes in the rock mass as defined in claim 15, wherein a plurality of fluid ports extend through the body of the plug, from an outer circumference at each fluid port location to a central port.

17. The plug configured to resist water pressure in the horizontal and downward dipping drill holes in the rock mass as defined in claim 1, wherein a second O-ring is received in at least one of the anchoring grooves and supports the first O-ring in a position at a beginning of the ramp whereby, in use, the two 0-rings engage with each another by frictional contact and rotate together in opposite directions, so that as the first O-ring rotates in a direction to roll down the ramp during installation it is held in place at the beginning of the ramp by a spring action of the second O-ring.

18. The plug configured to resist water pressure in the horizontal and downward dipping drill holes in the rock mass as defined in claim 17, wherein the first and second O-rings are of substantially the same size.

\* \* \* \* \*